(12) United States Patent
Noh

(10) Patent No.: US 11,403,907 B2
(45) Date of Patent: Aug. 2, 2022

(54) SYSTEM FOR OPERATING ELECTRIC-VEHICLE CHARGING STATION

(71) Applicants: BLUE NETWORKS Co., Ltd., Cheonan-si (KR); Soon-Yong Noh, Cheonan-si (KR)

(72) Inventor: Soon-Yong Noh, Cheonan-si (KR)

(73) Assignees: BLUE NETWORKS CO., LTD., Cheonan-si (KR); Soon-Yong Noh, Cheonan-si (KR)

( * ) Notice: Subject to any disclaimer, the term of this patent is extended or adjusted under 35 U.S.C. 154(b) by 102 days.

(21) Appl. No.: 16/990,281

(22) Filed: Aug. 11, 2020

(65) Prior Publication Data

US 2021/0256793 A1 Aug. 19, 2021

(30) Foreign Application Priority Data

Feb. 18, 2020 (KR) ........................ 10-2020-0019664

(51) Int. Cl.
  *G07F 15/00* (2006.01)
  *B60L 53/66* (2019.01)
  (Continued)

(52) U.S. Cl.
  CPC ............ *G07F 15/005* (2013.01); *B60L 53/65* (2019.02); *B60L 53/66* (2019.02); *G07C 1/30* (2013.01); *G07C 5/008* (2013.01); *G07F 15/10* (2013.01); *G07F 15/12* (2013.01); *B60L 2240/80* (2013.01); *B60L 2250/10* (2013.01); *B60L 2260/58* (2013.01)

(58) Field of Classification Search
  CPC ........ G07F 15/005; G07F 15/10; G07F 15/12; B60L 53/65; B60L 53/66; B60L 2240/80; B60L 2250/10; B60L 2260/58; B60L 53/11; B60L 2240/70; B60L 53/37; B60L 53/665; G07C 1/30; G07C 5/008; Y02T 10/70; Y02T 10/7072; Y02T 10/72; Y02T 90/12; Y02T 90/14; Y02T 90/16; Y02T 90/167; Y04S 30/12; Y04S 30/14; G06Q 50/30; G06Q 10/02; G06Q 2240/00; B60Y 2200/91; G06V 20/625
  See application file for complete search history.

(56) References Cited

U.S. PATENT DOCUMENTS

| | | | |
|---|---|---|---|
| 2014/0358749 A1* | 12/2014 | Williams | G06Q 30/04 705/34 |
| 2015/0202975 A1* | 7/2015 | Solomon | H02J 13/0003 705/7.26 |

(Continued)

FOREIGN PATENT DOCUMENTS

KR 10-2019-0135264 A 12/2019

*Primary Examiner* — Nha T Nguyen
(74) *Attorney, Agent, or Firm* — Novick, Kim & Lee, PLLC; Jae Youn Kim

(57) ABSTRACT

A system for operating an electric-vehicle charging station is proposed. The system is capable of preventing a general vehicle other than an electric vehicle from being parked in a parking station where the charging module for charging the electric vehicle is installed, preventing an electric vehicle from being parked in a charging station at a higher level than necessary, and eliminating the need for the driver of a subsequent vehicle to wait for charging in the charging station when there is a vehicle that is in a charging state in the charging station.

2 Claims, 2 Drawing Sheets

(51) Int. Cl.
*B60L 53/65* (2019.01)
*G07C 1/30* (2006.01)
*G07C 5/00* (2006.01)
*G07F 15/10* (2006.01)
*G07F 15/12* (2006.01)

(56) References Cited

U.S. PATENT DOCUMENTS

2017/0372529 A1* 12/2017 Gopalakrishnan ..... G07B 15/02
2021/0295610 A1* 9/2021 Lee ........................ G08G 1/149

* cited by examiner

SYSTEM FOR OPERATING ELECTRIC-VEHICLE CHARGING STATION

CROSS-REFERENCE TO RELATED APPLICATION

This application claims priority to and the benefit of Korean Patent Application No. 10-2020-0019664, filed on Feb. 18, 2020, the disclosure of which is incorporated herein by reference in its entirety.

TECHNICAL FIELD

The present disclosure relates to a system for operating an electric-vehicle parking station, and more particularly, to a system for operating an electric-vehicle parking station which is capable of preventing a general vehicle other than an electric vehicle from being parked in a parking area in which a charging module for charging an electric vehicle is installed, namely an electric-vehicle charging station, preventing the electric vehicle from being parked in the charging station at a higher level than necessary, and eliminating a need for the driver of a subsequent vehicle to wait for charging in the charging station when there is a vehicle that is being charged in the charging station.

BACKGROUND

In recent years, with a growing prevalence of an electric vehicle, an electric-vehicle charging station in which a charging module for charging the electric vehicle is installed is provided in a specific parking area.

A driver parks his/her own electric vehicle in such an electric-vehicle charging station, and pays a charging cost to charge a battery of the electric vehicle. However, in the case of a parking station with few parking areas, there is a problem that other general vehicles may sometimes be parked in the electric-vehicle charging station.

Therefore, a law has been established to impose penalty when a general vehicle other than the electric vehicle is parked in the electric-vehicle charging station, when the general vehicle is parked in a position at which the parking of the electric vehicle is hindered, when a thing or the like is placed in a position at which the parking of the electric vehicle is hindered, or when the electric vehicle is parked for an extremely long period of time.

However, such a law is difficult to control illegal actions unless there are parking controls by related officials or without the citizen's report. In addition, it is difficult to control all the charging stations every time with manpower of limited officials. Citizens are also not reporting such an illegal parking because they fear that the relationship between neighbors will be burdensome.

Therefore, there has been a need to develop a system for operating an electric-vehicle charging station, which is capable of preventing a general vehicle other than an electric vehicle, from being parked in the electric-vehicle charging station.

PRIOR ART DOCUMENT

Patent Document

Patent Document: Korean Patent Publication No. 10-2019-0135264 (2019 Dec. 6)

SUMMARY

The object of the present disclosure is to provide a system for operating an electric-vehicle charging station, which is capable of preventing a general vehicle other than an electric vehicle from being parked in a parking area where a charging module for charging the electric vehicle is installed, i.e., an electric-vehicle charging station.

Further, the object of the present disclosure is to provide a system for operating an electric-vehicle charging station, which is capable of preventing an electric vehicle from being parked in a charging station at a higher level than necessary.

Further, the object of the present disclosure is to provide a system for operating an electric-vehicle charging station, which is capable of eliminating a need for a driver of a subsequent vehicle to wait for charging in the charging station when there is a vehicle that is in a charging state in the charging station.

According to one embodiment of the present disclosure, there is provided a system for operating an electric-vehicle charging station, including: a camera configured to capture an image of a vehicle number of a parked vehicle; a charging module configured to supply a charging power to the parked vehicle; a controller configured to receive the captured image from the camera, extract the vehicle number of the parked vehicle from the captured image, and permit the supply of the charging power by the charging module when the extracted vehicle number corresponds to an electric vehicle; and an interface module configured to notify a guide message on a screen or in an audio under a control of the controller, wherein, when the extracted vehicle number does not correspond to the electric vehicle, the controller notifies the parked vehicle that a penalty is imposed to the parked vehicle through the interface module, and when a time during which the parked vehicle is not moved exceeds a set time after the notification, the controller transmits the extracted vehicle number as a number of an illegally parked vehicle to a server.

In one embodiment, when it is determined that the parked vehicle is moved within the set time after the notification, the controller may be configured to delete a data of the extracted vehicle number.

In one embodiment, the controller may be configured to receive one or more information of a charging time, a charged amount, and a charging cost through the interface module, and when the charging module corresponds to a rapid charging module, notifies the parked vehicle of a parking limit time through the interface module.

In one embodiment, when it is determined that the parking limit time has elapsed after the supply of the charging power by the charging module, the controller may be configured to transmit the extracted vehicle number as a vehicle number of the vehicle which has been parked over the parking limit time, to the server.

In one embodiment, the controller may be configured to receive a charge reservation information through the interface module, and when it is determined that the charging of the parked vehicle is completed and the parked vehicle is moved, the controller transmits a call information to a driver terminal of a first-ranked vehicle which inputs the charge reservation information preferentially.

In one embodiment, the controller may be configured to transmit the call information to a driver terminal of a second-ranked vehicle when there is no response signal from the driver terminal of the first-ranked vehicle for a first set time.

In one embodiment, after receiving the response signal from the driver terminal of the first-ranked vehicle within the first set time, when it is determined that the first-ranked vehicle is not parked over a second set time, the controller may be configured to transmit the call information to the driver terminal of the second-ranked vehicle.

In one embodiment, the controller may be configured to permit the supply of the charging power by the charging module only when a called vehicle that receives the call information is parked.

In one embodiment, when a vehicle other than the called vehicle is parked, the controller may be configured to notify, through the interface module, the respective vehicle that a penalty is to be imposed to the respective vehicle. When a time during which the movement of the respective vehicle is not detected exceeds a set time after the notification, the controller may be configured to transmit the extracted vehicle number as a number of an illegally parked vehicle to the server.

Effects of the Present Disclosure

The present disclosure provides an effect of preventing a general vehicle other than an electric vehicle from being parked in a parking station where a charging module for charging the electric vehicle is installed, namely an electric-vehicle charging station.

Further, the present disclosure provides an effect of preventing an electric vehicle from being parked in a charging station at a higher level than necessary.

Furthermore, the present disclosure provides an effect that, when there is a vehicle that is in a charging state in a charging station, a driver of a subsequent vehicle does not have to wait for charging in the charging station.

DETAILED DESCRIPTION

Figure 1:
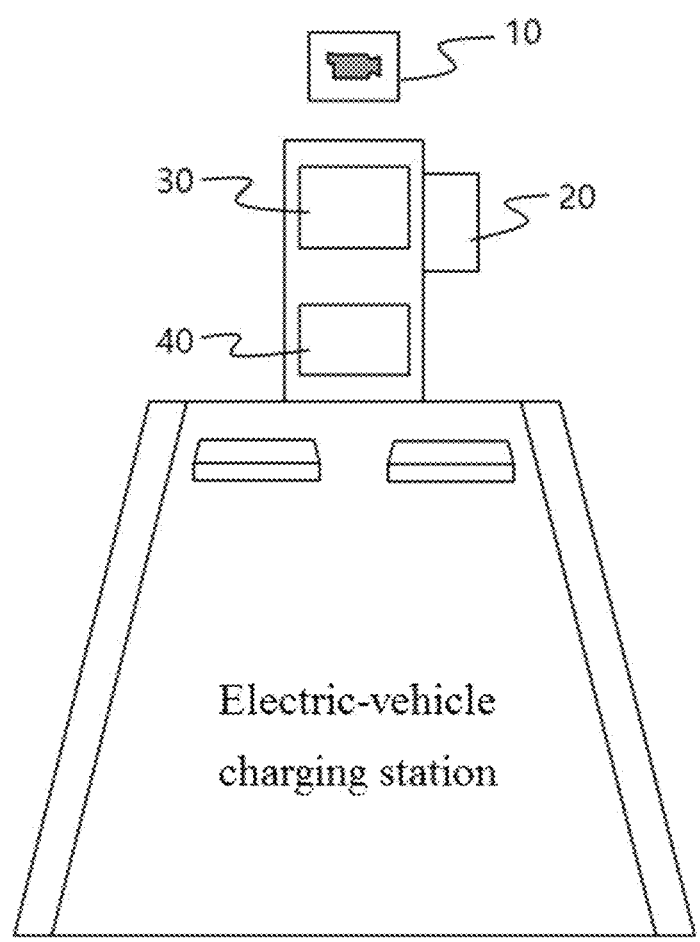
FIG. 1 is a view for illustrating an example of an electric-vehicle parking station operating system according to an embodiment of the present disclosure.
Figure 2:
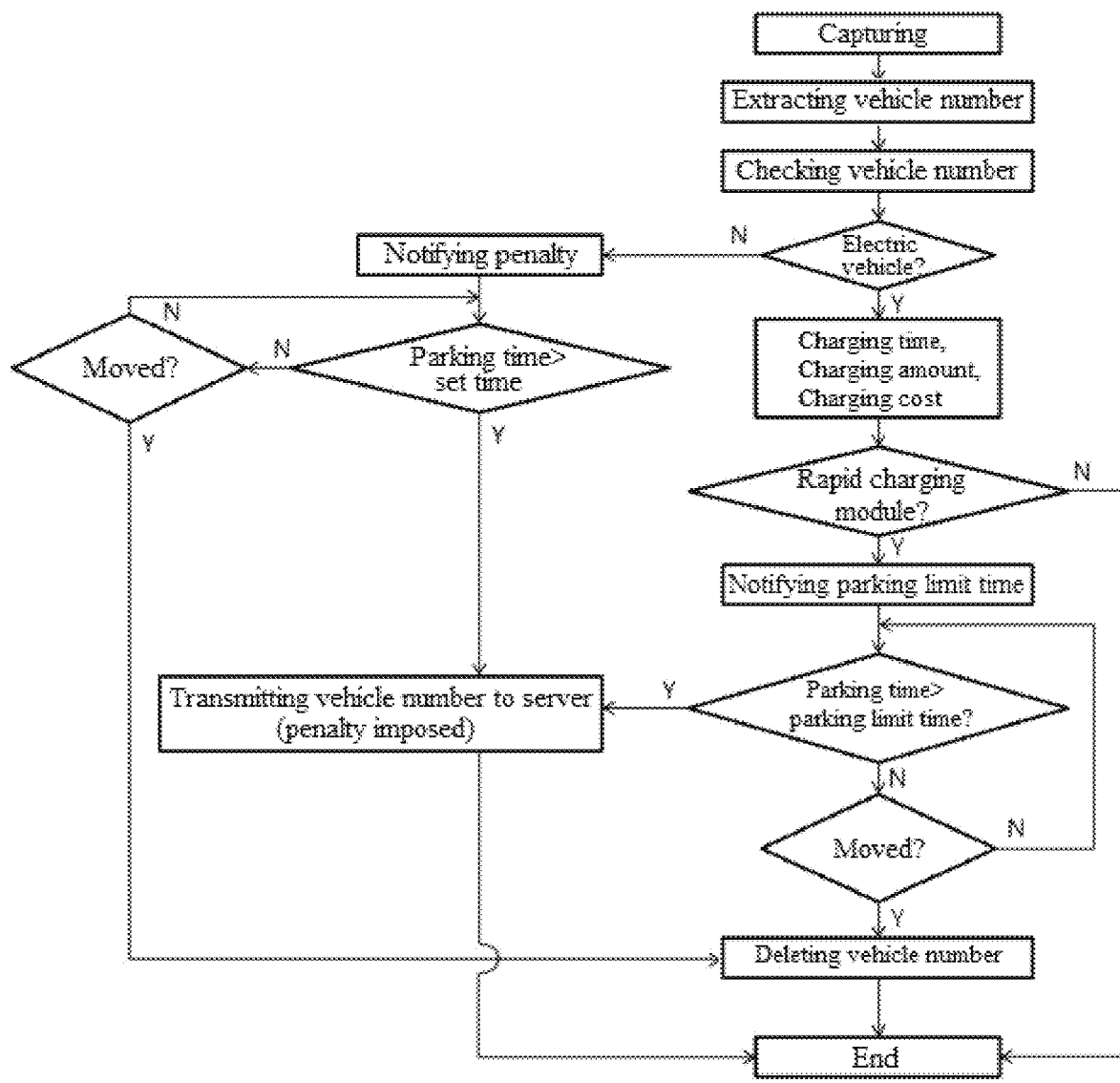
FIG. 2 is a flowchart for explaining a method performed by the electric-vehicle parking station operating system according to the present disclosure.

Hereinafter, some embodiments of the present disclosure will be described in detail with reference to the accompanying drawings.

An electric-vehicle parking station operating system of the present disclosure includes a camera 10 configured to capture an image of a vehicle number of a parked vehicle, a charging module 20 configured to supply a charging power to the parked vehicle, a controller 40 configured to extract the vehicle number out of the captured image provided from the camera 10 and permit the supply of the charging power by the charging module 20 when the extracted vehicle number corresponds to the electric vehicle, and an interface module 30 configured to notify a guide message with a screen or audio under the control of the controller 40.

The camera 10 serves to capture an image of the vehicle number of the parked vehicle. To do this, the camera 10 may be provided a rear side or front side of the parking station.

The camera 10 may further include a flash to be capable of capturing the vehicle number at night. An infrared imaging method may be utilized. In addition, the camera 10 may capture the vehicle number in the form of a motion image instead of a still image. In the case of capturing the still image, a sensor may further be provided to sense whether or not a vehicle enters.

The image captured by the camera 10 is transmitted to the controller 40. The controller 40 extracts the vehicle number from the image.

The charging module 20 serves to supply the vehicle with a charging power. To do this, the charging module 20 is provided at one side of the parking station.

The charging module 20 may include a slow charging module 20 and a rapid charging module 20. In the rapid charging module 20, a charging speed mode of 50 kW, 100 kW or more may be provided.

The charging module 20 may include a plurality of charging cables with different connection terminals. The reason for this is that most of domestic vehicles sold before 2017 use a DC CHAdoMO scheme, vehicles in U.S. and European countries use a DC combo scheme and the domestic vehicles employ the charging cable using the DC combo scheme from 2017. Among the domestic vehicles, for example, a vehicle of SM3 ZE model employs AC3 scheme. Thus, the conventional rapid charging module 20 provides the three modes of charging cables described above, but is not limited thereto.

Whether to supply the charging power from the charging module 20 is determined under the control of the controller 40. In a situation in which the supply of the charging power is not permitted by the controller 40, the charge is not performed even if the charging cable is connected to the vehicle.

The interface module 30 receives information such as a charging time, a charging coat, a charged amount, a charging mode, a payment mode, a charge reservation, and the like, and is configured to provide a guide message, such as the input information, information on whether or not penalty is imposed, parking time limit information, or the like, on screen or in audio, under the control of the controller 40.

To do this, the interface module 30 may be integrated with the charging module 20, but is not limited thereto. In some embodiments, a display for providing the information on the screen may be integrated with the charging module 20, and a speaker for providing the information in the audio may be provided separately from the interface module 30.

In some embodiments, a communication module may further be provided to send a vehicle number of an illegally parked vehicle or a vehicle number of a vehicle which has been parked over the parking time to a server under the control of the controller 40.

The controller 40 is configured to receive the captured image transmitted from the camera 10 and extract the vehicle number of the respective vehicle from the image. When it is determined that the extracted vehicle number corresponds to an electric vehicle, the controller 40 permits the supply of the charging power by the charging module 20. To do this, the controller 40 is provided at one side of the parking station.

First, the controller 40 receives the captured image transmitted from the camera 10, extracts the vehicle number of the respective vehicle from the image, and transmits the extracted vehicle number to the server. In the server, whether the currently-parked vehicle is an electric vehicle or a general vehicle is checked.

Such a checking is performed in real time simultaneously with the parking of the vehicle. When it is determined that the currently-parked vehicle is not an electric vehicle, the controller 40 notifies the currently-parked vehicle through the interface module 30 that the currently-parked vehicle is subjected to penalty.

In addition, when the respective vehicle is continuously parked even after the notification, that is, when a time during which the movement of the vehicle is not detected exceeds a set time, the controller 40 transmits information of the extracted vehicle number to the server as a number of an illegally parked vehicle. The information may be transmitted from the server to an associated authority so that the respective vehicle is subjected to penalty.

In some embodiments, the server of the present disclosure may be a server provided in the associated authority. The vehicle number of the illegally parked vehicle may be transmitted directly from the controller 40 to the server of the associated authority. At this time, when it is determined that the vehicle has been moved to other place within the set time after the penalty notification, i.e., the movement of the vehicle is detected, the controller 40 deletes the extracted vehicle number such that the vehicle is not subjected to penalty.

Further, the controller 40 receives one or more information such as the charging time, the charged amount, and the charging cost through the interface module 30. When the charging module 20 corresponds to the rapid charging module 20, the controller 40 notifies the vehicle of the parking limit time through the interface module 30.

Meanwhile, when it is determined that the parking limit time has elapsed after the supply of the charging power by the charging module 20, the controller 40 transmits the extracted vehicle number, namely the number of the vehicle which stays in the charging state, as a number of the vehicle which has been parked over the parking limit time, to the server. The parking limit time is legally set to fall within one hour for the rapid charging module 20, but may be varied according to the law.

In the case of the slow charging mode, a power of 3 kW to 5 kW per hour may be supplied. In order to charge an electric vehicle with a battery capacity of about 60 kWh at a level of 80% or more, it takes a time of at least 10 hours. Thus, such a time may not be included in the range of the parking limit time.

On the other hand, when a vehicle has been parked for charging, subsequent vehicles is required to wait until the vehicle that stays in the charging state moves. To address this, the controller 40 receives charge reservation information through the interface module 30.

The charge reservation information may include a vehicle number of a reservation vehicle and information on a driver terminal of the reservation vehicle. When receiving the charge reservation information, the controller 40 checks whether how many vehicles are reserved for charging and informs the checked result of drivers of the subsequent vehicles such that they determine whether to perform the charging.

Subsequently, when it is determined that the charging of the current vehicle is completed and moved, the controller 40 transmits call information to a driver terminal of a first-ranked vehicle. The call information may be a push alarm or a text message provided through an application. When there is no response signal from the first-ranked vehicle after a first set time, the controller 40 transmits call information to a driver terminal of a second-ranked vehicle. The reservation information of the first-ranked vehicle is discarded, and the reservation information of subsequent vehicles following the first-ranked vehicle is incremented one by one.

Meanwhile, there may be a case in which the response to the call information is made from the driver terminal of the first-ranked vehicle, but the first-ranked vehicle has not actually come for charging or has come too late. In order to prevent such situations, when it is determined that, after receiving the response signal from the driver terminal of the first-ranked vehicle within the first set time, the parking of the first-ranked vehicle is not detected over a second set time, the controller 40 transmits call information to the driver terminal of the second-ranked vehicle. Thereafter, the controller 40 discards the reservation information of the first-ranked vehicle and increments one by one the priority of the reservation information of the subsequent vehicles following the first-ranked vehicle.

Meanwhile, there may be a case in which a vehicle with a lower charging priority, that is, a vehicle that receives no call information try to park for charging. To address this, the controller 40 permits the supply of the charging power by the charging module 20 only when the called vehicle is parked.

Further, there is a possibility that after the charged vehicle leaves and before a subsequent rank of called vehicle is parked, another vehicle is parked in the empty space under a delusion. In this case, the controller 40 may control the interface module 30 to receive only reservation information instead of receiving information such as a charging time, a charging amount, a charging cost, and the like.

Further, when a vehicle other than the called vehicle is parked, the controller 40 notifies the respective vehicle through the interface module 30 that penalty is imposed to the respective vehicle. When it is determined that the movement of the respective vehicle is not detected for a set time after the notification, the controller 40 transmits the vehicle number of the parked vehicle (i.e., the extracted vehicle number) as a number of an illegally parked vehicle, to the server.

The present disclosure with the configuration described above provides an effect of preventing a general vehicle other than an electric vehicle from being parked in a parking station where the charging module 20 for charging the electric vehicle is installed, namely in an electric-vehicle charging station.

In addition, the present disclosure provides an effect of preventing an electric vehicle from being parked in a charging station at a higher level than necessary.

Furthermore, the present disclosure provides an effect of eliminating a need for a driver of a subsequent vehicle to wait for charging in the charging station when there is a vehicle that is in a charging state in the charging station.

EXPLANATION OF REFERENCE NUMERALS

10: camera
20: charging module
30: interface module
40: controller

What is claimed is:

1. A system for operating an electric-vehicle charging station, comprising:
    a camera configured to capture an image of a vehicle number of a parked vehicle;
    a charging module configured to supply a charging power to the parked vehicle;
    a controller configured to receive the captured image from the camera, extract the vehicle number of the parked vehicle from the captured image, and permit the supply of the charging power by the charging module when the extracted vehicle number corresponds to an electric vehicle; and
    an interface module configured to notify a guide message on a screen or in an audio under a control of the controller, wherein, when the extracted vehicle number does not correspond to the electric vehicle, the controller notifies the parked vehicle that a penalty is to be imposed to the parked vehicle through the interface module, and when a time during which the parked vehicle is not moved exceeds a set time after the notification, the controller transmits the extracted vehicle number as a vehicle number of an illegally parked vehicle to a server, wherein the controller receives one or more information of a charging time, a charged amount, and a charging cost through the interface module, and when the charging module corresponds to a rapid charging module, notifies the parked vehicle of a parking limit time through the interface module, wherein, when it is determined that the parking limit time has elapsed after the supply of the charging power by the charging module, the controller transmits the extracted vehicle number as a vehicle number of the vehicle which has been parked over the parking limit time, to the server, wherein the controller is configured to receive a charge reservation information through the interface module, and inform how many vehicles are reserved for charging, and when it is determined that the charging of the parked vehicle is completed and the parked vehicle is moved, the controller transmits a call information to a driver terminal of a first-ranked vehicle which inputs the charge reservation information preferentially, wherein the controller is configured to transmit the call information to a driver terminal of a second-ranked vehicle when there is no response signal from the driver terminal of the first-ranked vehicle for a first set time, and then discard the charge reservation information of the first-ranked vehicle and increment one by one a priority of the charge reservation information of subsequent vehicles following the first-ranked vehicle, wherein, after receiving the response signal from the driver terminal of the first-ranked vehicle within the first set time, when it is determined that the first-ranked vehicle is not parked over a second set time, the controller is configured to transmit the call information to the driver terminal of the second-ranked vehicle, and then discard the charge reservation information of the first-ranked vehicle and increment one by one the priority of the charge reservation information of the subsequent vehicles following the first-ranked vehicle, wherein the controller is configured to permit the supply of the charging power by the charging module only when a called vehicle that receives the call information is parked, wherein, when a vehicle other than the called vehicle is parked, the controller is configured to notify, through the interface module, the respective vehicle that a penalty is to be imposed to the respective vehicle, and when a time during which the movement of the respective vehicle is not detected exceeds a set time after the notification, the controller is configured to transmit the extracted vehicle number as a vehicle number of an illegally parked vehicle to the server, and wherein, when a vehicle other than the called vehicle is parked, the controller is configured to control the interface module to receive only reservation information instead of receiving information on the charging time, the charging amount, and the charging cost.

2. The system of claim 1, wherein, when it is determined that the parked vehicle is moved within the set time after the notification, the controller deletes a data of the extracted vehicle number.

* * * * *